US008046158B2

(12) United States Patent
Hedrick

(10) Patent No.: US 8,046,158 B2
(45) Date of Patent: Oct. 25, 2011

(54) METHOD AND SYSTEM FOR REDUCING RUNWAY INCURSION AT AIRPORTS

(75) Inventor: Geoffrey S. M. Hedrick, Malvern, PA (US)

(73) Assignee: Innovative Solutions and Support, Inc., Exton, PA (US)

( * ) Notice: Subject to any disclaimer, the term of this patent is extended or adjusted under 35 U.S.C. 154(b) by 548 days.

(21) Appl. No.: 12/317,425

(22) Filed: Dec. 23, 2008

(65) Prior Publication Data

US 2010/0161218 A1 Jun. 24, 2010

(51) Int. Cl.
*G08G 5/06* (2006.01)
*G01C 21/00* (2006.01)

(52) U.S. Cl. ......... 701/120; 701/117; 340/990; 340/945

(58) Field of Classification Search ........................ None
See application file for complete search history.

(56) References Cited

U.S. PATENT DOCUMENTS 4,196,474 A 4/1980 Buchanan et al.
5,493,309 A 2/1996 Bjornholt
5,574,648 A * 11/1996 Pilley ............................ 701/120
5,872,526 A 2/1999 Tognazzini
6,362,750 B1 3/2002 Castor
7,962,279 B2 * 6/2011 Pepitone et al. .............. 701/120
2008/0198794 A1 * 8/2008 Fields et al. .................. 370/328
2009/0115637 A1 * 5/2009 Naimer et al. ................ 340/979

* cited by examiner

*Primary Examiner* — Michael J. Zanelli
(74) *Attorney, Agent, or Firm* — Bryan Cave LLP

(57) ABSTRACT

The present invention relates to a system and method for minimizing or preventing runway incursion at airports by utilizing data packets of information transmitted over the voice communication channel used by pilots at the airport. The data packets of information contain the latitudinal and longitudinal position of the aircraft provided by an on board GPS receiver and a unique identifier for the aircraft, such as the tail number, which is then received by other aircraft on the same ground frequency, and the tower, and displayed on a geo-referenced map display of the airport provided to the pilots and the tower ground controller. The information may be updated by polling the various aircraft In this manner, information received from all active aircraft within an airport can be displayed on an electronic map of the airport which can be viewable by the pilots on the ground as well as the ground controller.

14 Claims, 2 Drawing Sheets

METHOD AND SYSTEM FOR REDUCING RUNWAY INCURSION AT AIRPORTS

This application is related to commonly owned U.S. Pat. No. 6,693,558, filed Dec. 14, 2001, issued Feb. 17, 2004, naming Geoffrey S. M. Hedrick as the sole inventor; copending U.S. patent application Ser. No. 11/212,059, filed Aug. 24, 2005, entitled "Aircraft Flat Panel Display System With Graphical Image Integrity", naming Geoffrey S. M. Hedrick, Shahram Askarpour, Markus Knopf, and Jeff Collins as joint inventors; and copending U.S. patent application Ser. No. 11/223,168, filed Sep. 8, 2005, entitled "Aircraft Flat Panel Display System With Improved Information Availability", naming Geoffrey S. M. Hedrick and Shahram Askarpour as joint inventors, and is an improvement thereon. The contents of each of the foregoing are hereby specifically incorporated by reference in their entirety.

BACKGROUND OF THE INVENTION

1. Field of the Invention

The present invention relates to methods and systems for reducing runway incursions at airports, including such methods and systems which utilize the local airfield communications channel and the flat panel display system on board the aircraft to provide visibility of active aircraft within an airport to other aircraft within the airport on the display system.

2. Description of the Related Art

Runway safety is a vital component of aviation safety as a whole and of vital concern to both the Federal Aviation Administration, pilots, and the flying public. Although considerable work has been done on the development of sophisticated collision avoidance systems to prevent mid-air collisions, such has not been the case with respect to systems to avoid collisions once the aircraft is safely on the ground, or to reduce or prevent runway incursions at crowded airports. Instead, considerable reliance has been placed on visual sightings by the control tower or a pilot of a taxiing aircraft to provide a verbal warning of a potential runway incursion so that evasive action can then be taken. Although this has proven satisfactory under certain conditions, it has not always worked and has resulted in catastrophic situations, such as the air disaster which occurred in Majorcca when two large commercial jets collided on the ground resulting in several deaths, as well as resulting in many near misses. This situation becomes even more critical at airports with multiple runways and taxiways where several aircraft are in motion on the ground simultaneously. In addition, the predicted growth over the next several years in air traffic will only add to the problem and implies that the number of such actual incidents may rise if improvements are not made in methods and systems for preventing or reducing runway incursions Existing flat panel display systems, such as the systems described in the aforementioned commonly owned U.S. Pat. No. 6,693,558, and two copending patent applications, all of which have been incorporated by reference in their entirety herein, include global positioning systems or GPS; however, to the applicant's knowledge, such GPS systems have not been utilized to avoid or prevent runway incursions. Moreover, commercial graphics processors, or CGPs, from the gaming industry have been used in the past by avionics suppliers for other applications with little to no mandated safety guidelines. In fact, it is known that there are potential failures which can occur within such commercial graphic processors which can result in a display of misleading information to a pilot, which is the last thing one would want in a system which would be intended to avoid or prevent runway incursions where misleading information could result in a potential disaster. Although complex and costly systems might be developed which could solve the problem, because of the need to then retrofit existing aircraft with such a system, there exists a need for a simple and low cost method and system capable of providing a geo-referenced display of all active aircraft within an airport to all aircraft within that airport, such as on an electronic airport map viewable to both the pilots on the ground as well as to the ground controller in the tower.

SUMMARY OF THE INVENTION

An improved method and system for reducing runway incursion periodically transmits a data packet on the normal airfield voice communication channel from an aircraft dispersed on the ground at the airport when the aircraft is utilizing the voice communication channel, with the data packet comprising a current ground position for the aircraft along with a unique identifier for the aircraft; provides a geo-referenced map display of the airport; and receives the transmitted data packet at another location at the airport and displays the ground location of the data packet transmitting aircraft on the geo-referenced map display for indicating the position of the aircraft on the ground at the airport. Each of the aircraft dispersed on the ground at the airport would have a different unique identifier to distinguish the various aircraft on the geo-referenced map display. In addition, each of the dispersed aircraft is polled in order to update the geo-referenced map display with updated ground position information on the location of the various dispersed aircraft. When the microphone is keyed to talk by the pilot, a short burst, such as a 3 microsecond burst or one which could be transmitted for up to 20 microseconds, of data containing the uniques aircraft identifier, such as the tail number, for example, and the ground position of the aircraft is transmitted to the control tower and all other aircraft on the same frequency, such as the airport ground frequency of 121.6 or 121.9 MHz Since all aircraft at a given airport must communicate with the tower over a common frequency, this transmitted data packet of GPS information which takes place over that communication channel, together with the geo-referenced map display, enables both the control tower and the pilots on the ground, all tuned to that same communication channel, to receive an accurate display of the exact location and identification of each of the aircraft dispersed on the ground at the airport on their geo-referenced map display, such as part of the flat panel display system in the aircraft and is believed to provide a simple, cost effective solution to the problem of minimizing, if not preventing runway incursions.

DETAILED DESCRIPTION OF THE CURRENTLY PREFERRED EMBODIMENT

Figure 1:
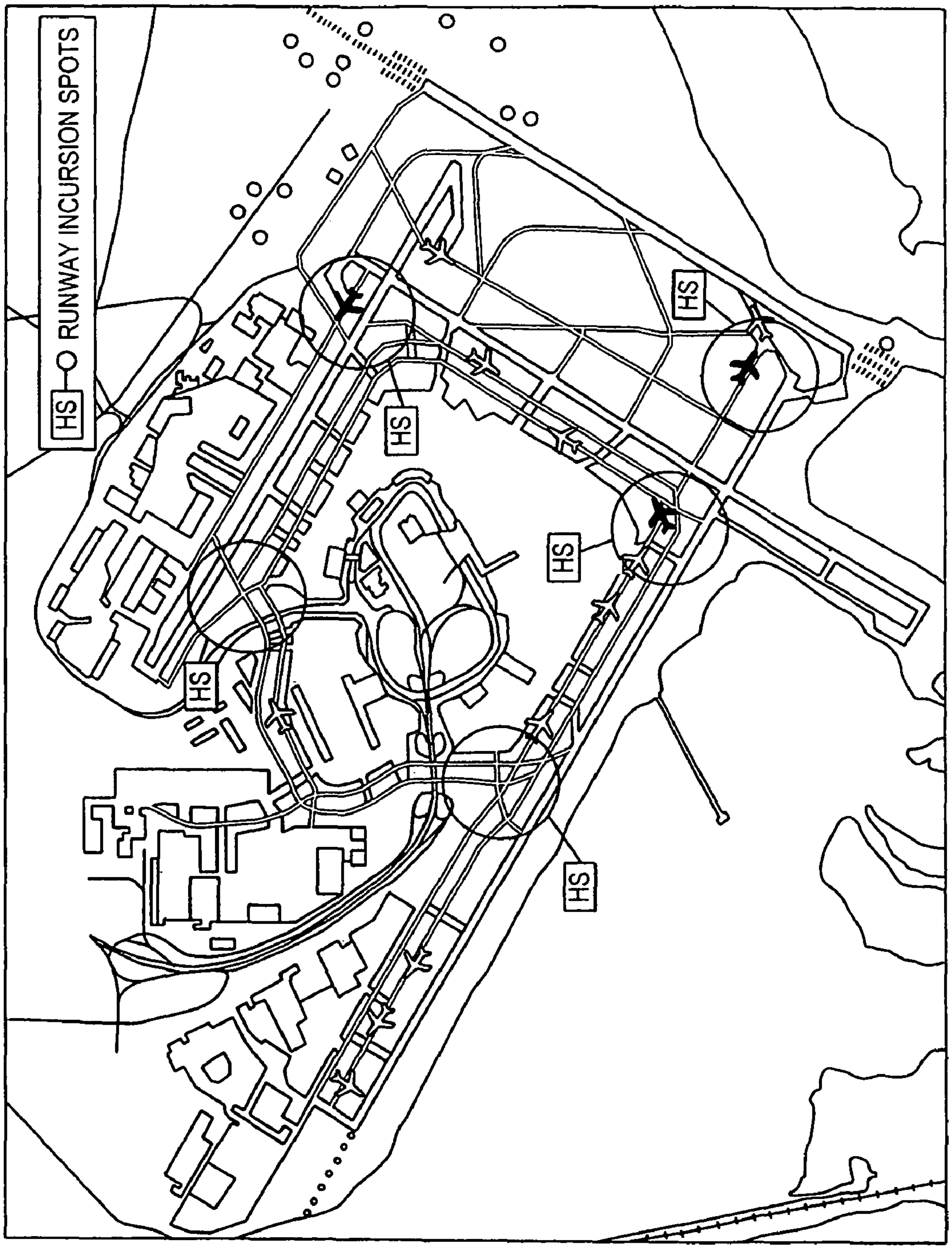
FIG. 1 is an illustrative example of a typical geo-referenced map display of an airport for use with the system and method of the present invention, with JFK airport in New York being represented therein.
Figure 2:
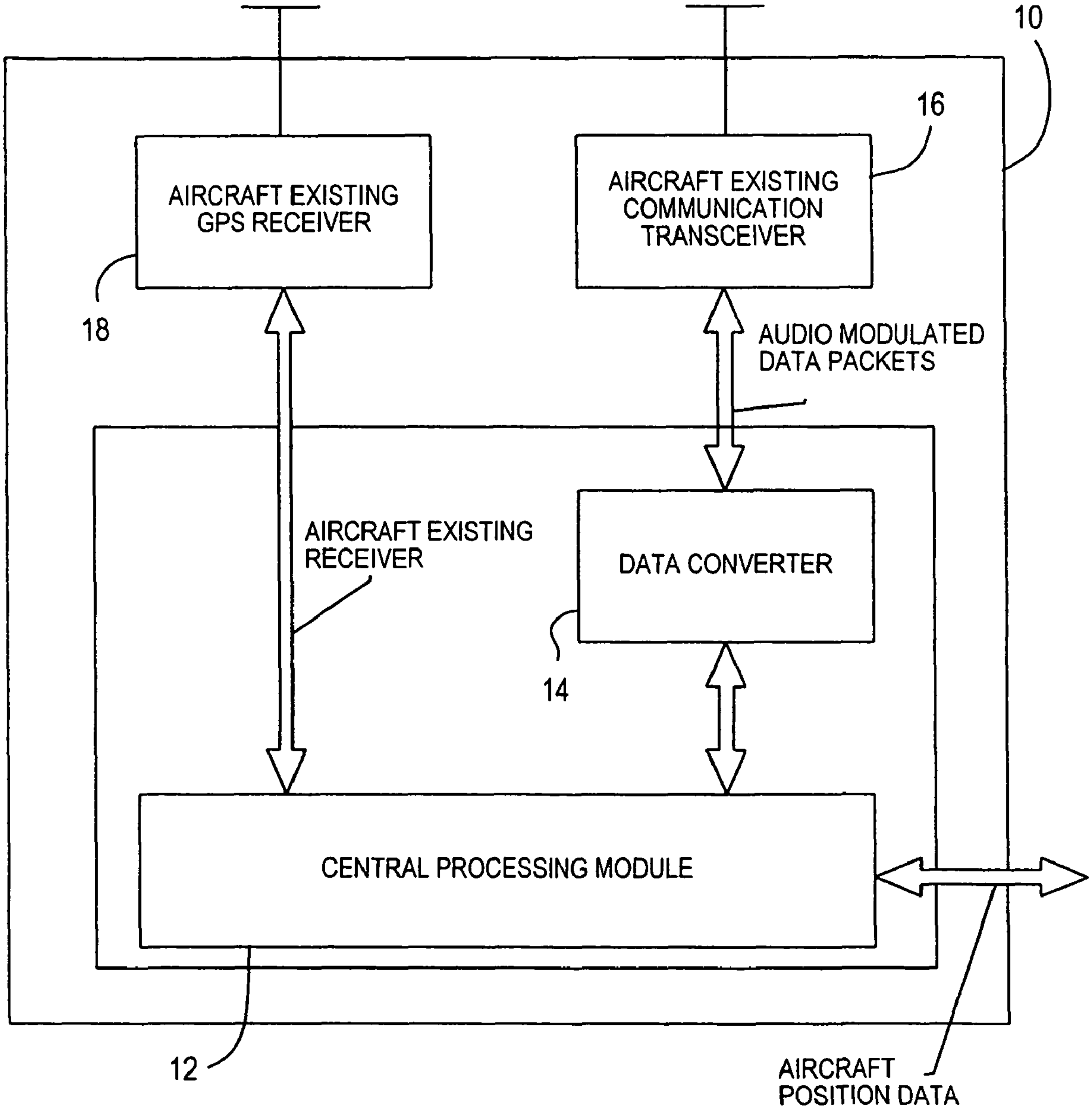
FIG. 2 is a block diagram of a typical interface box usable either with a flat panel display system such as described in U.S. Pat. No. 6,693,558 incorporated by reference herein, or with a conventional geo-referenced map display in the control tower or on board an aircraft, for use with the system and method of the present invention.

Referring now to the drawings in detail, and initially to FIG. 2, this drawing illustrates a presently preferred embodiment of a typical interface box 10 for use with the present invention. As shown and preferred, the interface box 10 includes a conventional central processing module 12 and a conventional data converter 14 which conventionally performs the modulation and demodulation of any data packets which are transmitted over conventional audio signals, such as when an aircraft communicates with the control tower over the assigned voice communication channel for the airport, such as 121.6 MHz or 121.9 MHz. The data converter 14 provides compatibility with the existing conventional communication transceiver 16 on board the aircraft. If the aircraft in which the present invention has an existing on board GPS receiver 18, such as the type of GPS receiver employed in the flat panel display system described in U.S. Pat. No. 6,693,558, it can be utilized to provide the ground position of the aircraft to the central processing module 12 in accordance with the present invention; however, if the aircraft is not otherwise fitted with a GPS receiver for providing this information, then a simple conventional GPS module can be added to the interface box 10 for providing the ground position of the aircraft to the central processing module 12. Preferably, in either event, the interface box 10 can be included on board the aircraft as part of the aircraft audio panel (not shown). The interface box 10, preferably in response to a keying of the microphone (not shown) by the pilot in order to communicate by voice with the control tower over the assigned voice communication channel for the airport, conventionally transmits a data packet from the aircraft over that communication channel to the tower, and any other aircraft tuned to that channel and capable of reception, which preferably consists of the current latitudinal and longitudinal position of the aircraft from the GPS information provided to the central processing module 12, as well as a unique identifier for that aircraft, such as its tail number. Preferably, a similar type of interface box 10 is located at the control tower and on board other aircraft for receiving this information and conventionally converting into displayable information on a conventional geo-referenced map display, such as the type of display illustrated in FIG. 1 in which the ground position of the aircraft, based on the transmitted latitudinal and longitudinal GPS information, would be displayed next to its tail number. Thus, the central processing module 12 generates the data packets periodically and sends them to the transmitter audio input via the data converter 14 and also processes any input data packets as conventionally decoded by the data converter 14 from the audio output of the receiver. Preferably, the interface box 10 receives data packets from all other aircraft located at the same airport and passes on the information to the display system for conventional processing so that information received from all active aircraft within an airport, such as JFK by way of example, can then be displayed on an electronic airport map viewable to the ground controller in the tower as well as to any other aircraft equipped with a display system capable of displaying a geo-referenced map of the airport.

In this regard, when the pilot keys the microphone to talk for up to 20 microseconds, for example, the latitudinal and longitudinal position of the aircraft along with its unique identifier, such as the tail number, would be transmitted in the data packet to all other aircraft on that frequency as well as to the ground controller on that frequency. Preferably, this could be accomplished in a 3 microsecond burst. In additions in order to update this information periodically so as to provide an updated geo-referenced map display containing the latest ground position information for the various aircraft dispersed on the ground, the tower preferably polls the aircraft by transmitting a signal to the various interface boxes via the communication channel which respond with data packets containing the updated information for updating the displays.

Consequently, by utilizing the system and method of the present invention, the problem of runway incursion can be overcome by utilizing the existing aircraft radio and airport frequency in an efficient and economical manner so that an aircraft equipped with a display system capable of displaying a geo-referenced map of the airport can superimpose positions of all other aircraft on the map for pilot information as well as the ground track that the aircraft needs to follow based on its ultimate destination within the airport, to enable safe and efficient movement of the aircraft on the ground.

It should be recognized that structures and/or elements and/or method steps shown and/or described in connection with any disclosed form or embodiment of the invention may be incorporated in any other disclosed or described or suggested form or embodiment as a matter of design choice. Moreover, while there have shown and described and pointed out fundamental novel features of the invention as applied to preferred embodiments thereof, it will be understood that various omissions and substitutions and changes in the form and details of the system and method illustrated may be made by those skilled in the art without departing from the spirit and scope of the present invention.

What is claimed is:

1. A method for reducing runway incursion by a plurality of aircraft dispersed on the ground at an airport having a common local airfield voice communication channel for communicating with pilots landing and/or taking off from said airport, the method comprising the steps of:

periodically transmitting a data packet on said airfield voice communication channel from at least one of said dispersed aircraft when said one aircraft utilizes said voice communication channel, said data packet comprising a current ground position for said one aircraft at said airport along with a unique identifier for said one aircraft;

providing a geo-referenced map display of said airport; and receiving said transmitted data packet at another location at said airport and displaying the ground location of said data packet transmitting aircraft on said geo-referenced map display for indicating the position of said aircraft on the ground at said airport.

2. A method in accordance with claim 1 wherein said data packet transmitting step further comprises the step of periodically transmitting said data packet on said airfield voice communication channel from a plurality of said dispersed aircraft, said data packet being transmitted for a given aircraft in said plurality when said given aircraft utilizes said voice communication channel, each of said aircraft in said plurality having a different unique identifier; and said receiving step comprises the step of displaying said ground location of each of said data packet transmitting aircraft on said geo-referenced map display for indicating the position of each of said aircraft on the ground at said airport.

3. A method in accordance with claim 2 wherein said geo-referenced map display providing step comprises the step of providing said geo-referenced map display at least at a common location at said airport for enabling display of said airport ground locations at said common location.

4. A method in accordance with claim 3 wherein said geo-referenced map display providing step further comprises the step of providing said geo-referenced map display in each of said aircraft receiving said transmitted data packet for enabling said transmitted aircraft ground locations to be displayed on said geo referenced map display for indicating the position of said transmitting aircraft on the ground at said airport.

5. A method in accordance with claim 2 wherein said geo-referenced map display providing step comprises the step of providing said geo-referenced map display in each of said aircraft receiving said transmitted data packet for enabling said transmitted aircraft ground locations to be displayed on said geo referenced map display for indicating the position of said transmitting aircraft on the ground at said airport.

6. A method in accordance with claim 5 further comprising the step of polling each of said aircraft to update said geo-referenced map display with updated ground position information on the location of said aircraft; and updating said geo-referenced map display with said updated ground position information.

7. A method in accordance with claim 1 wherein said data packet transmitting step further comprises the step of transmitting said data packet on said voice communication channel when voice communication is initiated from said aircraft on said voice communication channel at said airport.

8. A system for reducing runway incursion by a plurality of aircraft dispersed on the ground at an airport having a common local airfield voice communication channel for communicating with pilots landing and/or taking off from said airport, the system comprising:

means for periodically transmitting a data packet on said airfield voice communication channel from at least one of said dispersed aircraft when said one aircraft utilizes said voice communication channel, said data packet comprising a current ground position for said one aircraft at said airport along with a unique identifier for said one aircraft;

means for providing a geo-referenced map display of said airport; and means for receiving said transmitted data packet at another location at said airport and displaying the ground location of said data packet transmitting aircraft on said geo-referenced map display for indicating the position of said aircraft on the ground at said airport.

9. A system in accordance with claim 8 wherein said data packet transmitting means further comprises means for periodically transmitting said data packet on said airfield voice communication channel from a plurality of said dispersed aircraft, said data packet being transmitted for a given aircraft in said plurality when said given aircraft utilizes said voice communication channel, each of said aircraft in said plurality having a different unique identifier; and said receiving means further comprises means for displaying said ground location of each of said data packet transmitting aircraft on said geo-referenced map display for indicating the position of each of said aircraft on the ground at said airport.

10. A system in accordance with claim 9 wherein said geo-referenced map display means comprises means for providing said geo-referenced map display at least at a common location at said airport for enabling display of said airport ground locations at said common location.

11. A system in accordance with claim 10 wherein said geo-referenced map display means comprises means for providing said geo-referenced map display in each of said aircraft receiving said transmitted data packet for enabling said transmitted aircraft ground locations to be displayed on said geo referenced map display for indicating the position of said transmitting aircraft on the ground at said airport.

12. A system in accordance with claim 9 wherein said geo-referenced map display means comprises means for providing said geo-referenced map display in each of said aircraft receiving said transmitted data packet for enabling said transmitted aircraft ground locations to be displayed on said geo referenced map display for indicating the position of said transmitting aircraft on the ground at said airport.

13. A system in accordance with claim 12 further comprising means for polling each of said aircraft to update said geo-referenced map display with updated ground position information on the location of said aircraft; said geo-referenced map display means further comprising means for updating said geo-referenced map display with said updated ground position information.

14. A system in accordance with claim 8 wherein said data packet transmitting means further comprises means for transmitting said data packet on said voice communication channel when voice communication is initiated from said aircraft on said voice communication channel at said airport.

* * * * *